United States Patent
Yang et al.

(10) Patent No.: US 11,809,364 B2
(45) Date of Patent: Nov. 7, 2023

(54) METHOD AND SYSTEM FOR FIRMWARE FOR ADAPTABLE BASEBOARD MANAGEMENT CONTROLLER

(71) Applicant: Quanta Computer Inc., Taoyuan (TW)

(72) Inventors: Chi-Ling Yang, Taoyuan (TW); Yen-Ping Tung, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 17/450,144

(22) Filed: Oct. 6, 2021

(65) Prior Publication Data

US 2022/0414045 A1    Dec. 29, 2022

Related U.S. Application Data

(60) Provisional application No. 63/215,142, filed on Jun. 25, 2021.

(51) Int. Cl.
*G06F 13/36* (2006.01)
*G06F 13/42* (2006.01)
*G06F 13/16* (2006.01)

(52) U.S. Cl.
CPC ...... *G06F 13/4282* (2013.01); *G06F 13/1668* (2013.01); *G06F 2213/0016* (2013.01); *G06F 2213/0026* (2013.01); *G06F 2213/0042* (2013.01)

(58) Field of Classification Search
None
See application file for complete search history.

(56) References Cited

U.S. PATENT DOCUMENTS

| | | | | |
|---|---|---|---|---|
| 8,830,611 | B1* | 9/2014 | Chen | G06F 11/325 |
| | | | | 360/31 |
| 9,336,174 | B1* | 5/2016 | Balasubramanian | |
| | | | | G06F 13/4027 |
| 10,534,734 | B1 | 1/2020 | Lambert et al. | |
| 2013/0054943 | A1* | 2/2013 | Bhatia | G06F 9/455 |
| | | | | 713/1 |
| 2014/0129821 | A1* | 5/2014 | Tian | G06F 9/4401 |
| | | | | 713/2 |
| 2017/0180987 | A1* | 6/2017 | Tung | H04L 9/3234 |

(Continued)

FOREIGN PATENT DOCUMENTS

| | | |
|---|---|---|
| CN | 111078603 A | 4/2020 |
| CN | 111800298 A | 10/2020 |

(Continued)

OTHER PUBLICATIONS

TW Office Action for Application No. 111105708, dated Dec. 13, 2022, w/ First Office Action Summary.

(Continued)

*Primary Examiner* — Henry Tsai
*Assistant Examiner* — Dean Phan
(74) *Attorney, Agent, or Firm* — NIXON PEABODY LLP (57) ABSTRACT

A baseboard management controller (BMC) system adaptable to support multiple computer platforms is disclosed. The BMC system has a BMC CPU chip including a processor executing firmware. The BMC CPU chip is coupled via an external bus to an interface chip. The interface chip includes input/output interfaces for different communication protocols to interface with components on a computer node.

17 Claims, 5 Drawing Sheets

(56) References Cited

U.S. PATENT DOCUMENTS

2018/0113628 A1* 4/2018 Roberts .............. G11C 7/1072
2022/0114068 A1* 4/2022 Straw ................. G06F 11/263

FOREIGN PATENT DOCUMENTS

TW 201737669 A 10/2017
TW 202111555 A 3/2021

OTHER PUBLICATIONS

TW Search Report for Application No. 111105708, dated Dec. 13, 2022, w/ First Office Action.

* cited by examiner

METHOD AND SYSTEM FOR FIRMWARE FOR ADAPTABLE BASEBOARD MANAGEMENT CONTROLLER

CROSS-REFERENCE TO RELATED APPLICATIONS

This application claims priority from and benefit of U.S. Provisional Patent Application Ser. No. 63/215,142, filed on Jun. 25, 2021, titled "Scalable BMC Chip Design Architecture," which is hereby incorporated by reference herein in its entirety.

TECHNICAL FIELD

The present disclosure relates generally to a baseboard management controller (BMC) for multi-node computer systems. More particularly, aspects of this disclosure relate to a BMC based system that uses interface chips without firmware to allow the BMC system to be scaled for multiple node configurations.

BACKGROUND

Servers are employed in large numbers for high demand applications, such as network-based systems or data centers. The emergence of cloud computing applications has increased the demand for data centers. Data centers have numerous servers that store data and run applications accessed by remotely-connected computer device users. A typical data center has physical rack structures with attendant power and communication connections. Each rack may hold multiple computing servers and storage servers. Each server generally includes hardware components such as processors, memory devices, network interface cards, power supplies, and other specialized hardware. Servers generally include a baseboard management controller (BMC) that manages the operation of hardware components as well as support components such as power supplies and fans. The BMC also communicates operational data to a central management station that manages the servers of the rack. The BMC relieves the need for the Central Processing Unit (CPU) of the server to monitor server operations. Thus, a BMC must be capable of interfacing with numerous varieties of hardware components on a given server.

For example, a baseboard management controller may be a chip with a complex processor such as, but not limited to, those sold by ASPEED Technology, Nuvotech, and TI. Such BMCs require firmware to allow programming of the complex processor to perform different functions. Currently known BMCs also include multiple input/output interface circuits to allow communication with a variety of hardware components using different communication protocols.

Figure 1A:
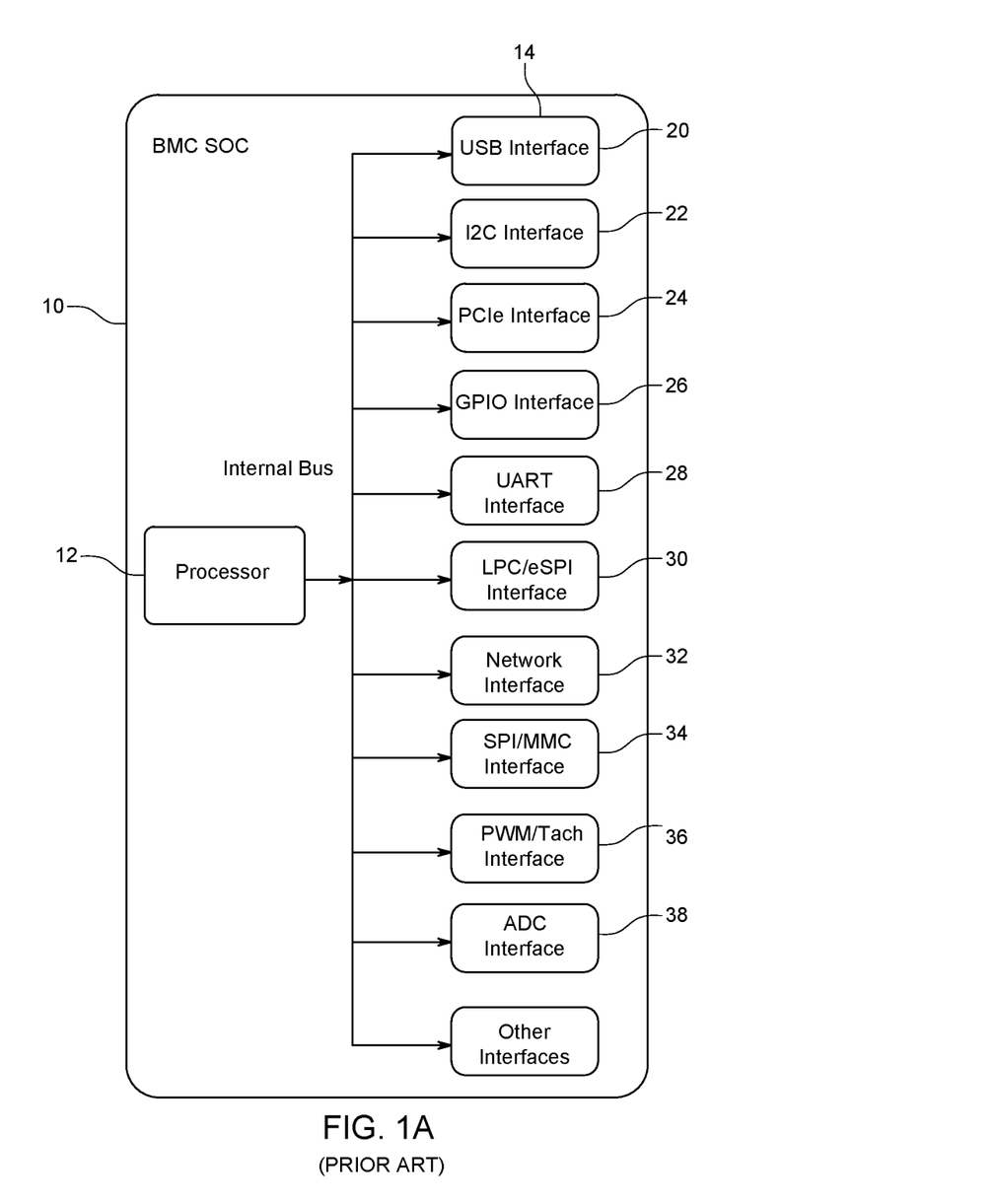
FIG. 1A is block diagram of a prior art baseboard management controller (BMC) chip.

FIG. 1A shows a block diagram of a traditional BMC chip 10. The BMC chip 10 is a system on chip (SOC) that includes a processor 12, an internal bus 14, and a series of input/output interfaces, each having separately designed hardware from a vendor. All of the different interfaces are designed for inclusion in the SOC BMC chip 10 to allow different devices to communicate with the BMC chip 10. In this example, the interfaces include a universal serial bus (USB) interface 20, an inter-integrated circuit (I2C) interface 22, a peripheral connect interface express (PCIe) interface 24, a general purpose input/output (GPIO) interface 26, a Universal Asynchronous Receiver/Transmitter (UART) interface 28, a Local Inter-Process Communication (LPC)/enhanced Serial Peripheral Interface (eSPI) 30, a network interface 32, an SPI/Microsoft Management Console (MMC) interface 34, a pulse width modulation (PWM)/tachometer interface 36, and an analog-to-digital converter interface 38. Other interfaces for other communication protocols may also be provided.

The life cycle of BMC chips was as long as 5 to 6 years until recently. However, BMC chips must now be designed to support more and more platforms, generating requirements for various different input/output interfaces. As platforms evolve, BMC hardware and/or firmware must be continuously upgraded, thus shortening the BMC life cycle as new requirements exceed the capabilities of current BMCs. Moreover, the scalability of the traditional BMC chip 10 is limited because the input/output interfaces are hardwired and cannot be expanded. For example, if the number of sensors on a board exceed the number of channels that may communicate with the required interface, the BMC chip 10 will not function.

Figure 1B:
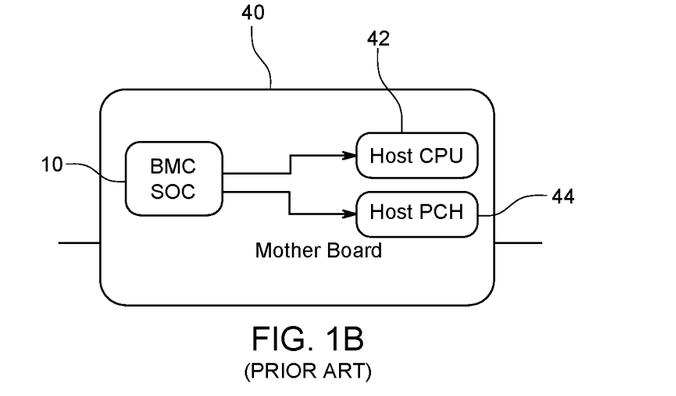
FIG. 1B is a block diagram of the prior art BMC chip in FIG. 1A used in one type of single node computer system.

FIG. 1B shows one use case of the traditional BMC chip 10 in FIG. 1A in a single node. The node has a motherboard 40 with a CPU 42 and a platform control hub (PCH) 44. In this example, the BMC 10 uses different interfaces to communicate with the CPU 42 and the PCH 44 through multiple communication protocols. The CPU 42 communicates with the BMC chip 10 via the I2C interface 22, the PCIe interface 24, and the LPC/SPI interface 30. The PCH 44 communicates with the BMC chip 10 via the USB interface 20, the PCIe interface 24, and the LPC/SPI interface 30. The GPIO interface 26 may be used for visual indicators such as LEDs. The UART interface 28 may be used for host serial connection over a network. In this example, the firmware for the BMC chip 10 must be developed for the specific CPU 42 and PCH 44.

Figure 1C:
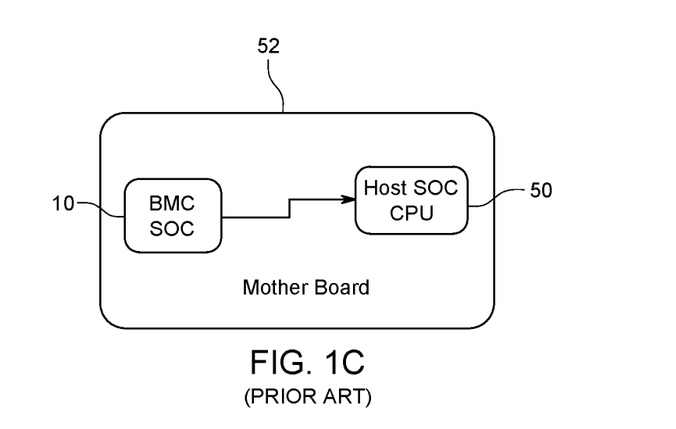
FIG. 1C is a block diagram of the prior art BMC chip in FIG. 1A used in another type of single node computer system.

FIG. 1C shows another use case of the traditional BMC 10 in a single node with a system on chip (SOC) CPU 50 on a motherboard 52. In this example, the functions of the PCH 44 in FIG. 1B have been integrated in the system on chip CPU 50. The BMC 10 may use different interfaces to communicate with the SOC CPU 50, such as the USB interface 20, the I2C interface 22, the PCIe interface 24, and the LPC/SPI interface 30. The firmware for the BMC chip 10 in FIG. 1C must be developed for the SOC CPU 50 and thus is different from the firmware for the BMC chip 10 in FIG. 1B.

Figure 1D:
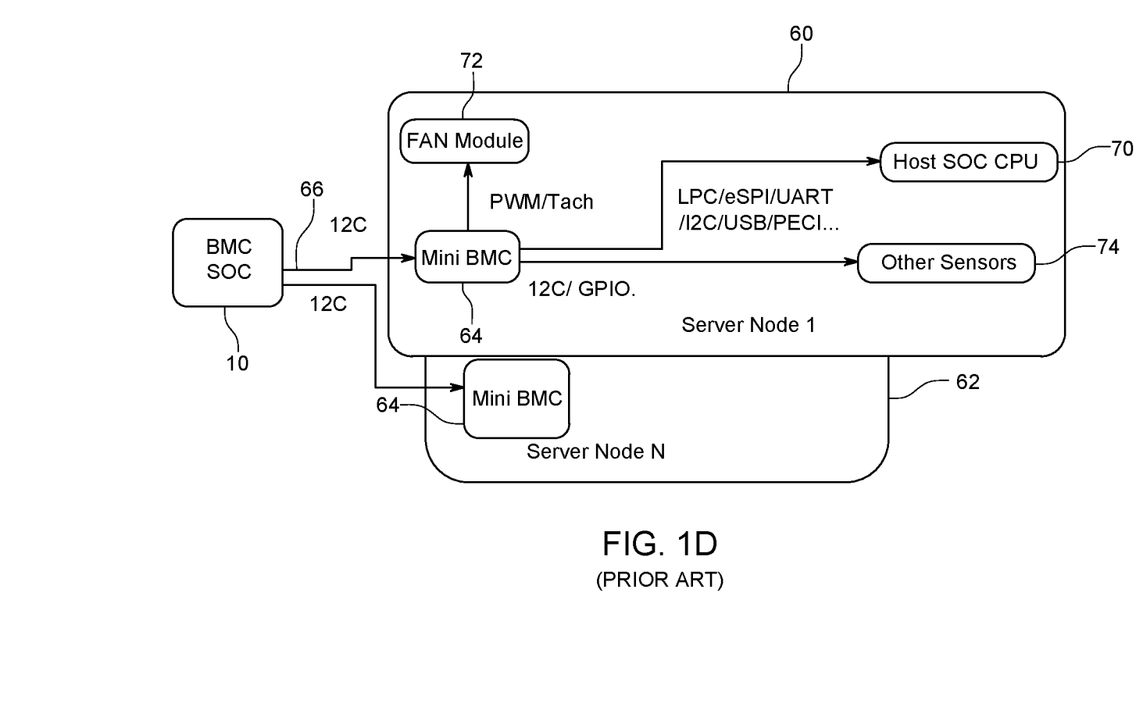
FIG. 1D is a block diagram of the prior art BMC chip in FIG. 1A used in a multi-node computer system.

FIG. 1D shows a multi-node design that has the central BMC chip 10 located remotely from a series of nodes such, as a first node 60 and another N node 62. Although only two nodes are shown in FIG. 1D, such a system may have more than two nodes. The multi-node design may be a chassis with a baseboard holding the BMC chip 10, and different blades (nodes) having processors with different hardware components. The BMC 10 communicates with a mini-BMC 64 on each of the nodes 60 and 62 via a bus such as an I2C bus 66. The mini-BMC 64 is a lower cost (relative to the traditional BMC 10) BMC that includes several interfaces.

In this example, each node 60 and 62 may have a different electrical schematic layout, requiring different configurations for the mini-BMC 64 to interact with components on the node. Thus, each of the mini-BMCs 64 may require firmware specific to the components of the specific node. For example, the mini-BMC 64 for the node 60 interfaces with a host SOC CPU 70 via the LPC/SPI interface, UART interface, I2C interface, and USB interface. Sensors 74 on the node 60 interface with the mini-BMC 64 via an I2C interface and a GPIO interface. A fan module 72 interfaces with the mini-BMC 64 via a PWM/Tach interface. The mini-BMC 64 for the node 62 may be required to communicate with other components and require different firmware specific to those components. Thus, the multi-node design in FIG. 1D needs to maintain firmware for the BMC chip 10 as well as firmware for each of the mini-BMCs 64. The multiple sets of firmware are difficult to maintain and develop.

Thus, among other needs, there is a need for a BMC system that may support multiple configurations of hardware on different nodes. There is a further need for a BMC system that may be scaled for systems with multiple nodes. There is also a need for BMC system that does not require firmware for fixed interface chips to minimize firmware resource requirements.

SUMMARY

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

According to certain aspects of the present disclosure, a baseboard management controller (BMC) system adaptable to support multiple computer platforms is disclosed. The BMC system has a BMC CPU chip including a processor executing firmware. The BMC CPU chip is coupled via an external bus to an interface chip. The interface chip includes input/output interfaces for different communication protocols to interface with components on a computer node.

A further implementation of the example system is an embodiment where the communication protocols include at least one of the group consisting of a universal serial bus (USB), an inter-integrated circuit (I2C), a peripheral connect interface express (PCIe), a general purpose input/output (GPIO), a Universal Asynchronous Receiver/Transmitter (UART), a Local Inter-Process Communication (LPC)/enhanced Serial Peripheral Interface (eSPI), a network, a pulse width modulation signal, an analog-to-digital converter signal, and an SPI/Microsoft Management Console (MMC). Another implementation is where the plurality of input/output interfaces of the interface chip function independent of firmware. Another implementation is where the system further includes a memory accessible by the BMC CPU chip, wherein the memory stores the firmware. Another implementation is where the BMC CPU chip includes a plurality of input/output interfaces coupled to the processor via an internal bus. Another implementation is where the system further incudes a second interface chip coupled to the BMC CPU chip via the external bus, the second interface chip including a plurality of input/output interfaces for different communication protocols to interface with components on a computer node. Another implementation is where the BMC CPU chip is on a baseboard, and where the first and second interface chips are on separate computer nodes.

Another implementation is where the first and second interface chips have identical input/output interfaces. Another implementation is where the first and second BMC interface chips have different input/output interfaces. Another implementation is where the BMC is on a baseboard, and wherein the first and second interface chips are both on a computer node.

Another disclosed example is a multi-node computer system including a baseboard having a baseboard management controller (BMC) CPU chip and a memory storing firmware for the BMC CPU chip. The BMC CPU chip has a processor and an external bus interface. An external bus is coupled to the external bus interface of the BMC CPU chip. A first computer node has a first BMC interface chip coupled to the external bus and components on the computer node. A second computer node has a second BMC interface chip coupled to the external bus and components on the second computer node A further implementation of the example system is an embodiment where the communication protocols include at least one of the group consisting of a universal serial bus (USB), an inter-integrated circuit (I2C), a peripheral connect interface express (PCIe), a general purpose input/output (GPIO), a Universal Asynchronous Receiver/Transmitter (UART), a Local Inter-Process Communication (LPC)/Serial Peripheral Interface (SPI), a network interface, a pulse width modulation, and an SPI/Microsoft Management Console (MMC) a universal serial bus (USB), an inter-integrated circuit (I2C), a peripheral connect interface express (PCIe), a general purpose input/output (GPIO), a Universal Asynchronous Receiver/Transmitter (UART), a Local Inter-Process Communication (LPC)/enhanced Serial peripheral interface (eSPI), a network, a pulse width modulation signal, an analog-to-digital converter signal, and an SPI/Microsoft Management Console (MMC). Another implementation is where the plurality of input/output interfaces of the interface chip function independent of firmware. Another implementation is where the baseboard includes a memory storing firmware accessible by the BMC CPU chip. Another implementation is where the BMC CPU chip includes a plurality of interfaces coupled to the processor via an internal bus. Another implementation is where the first and second interface chips have identical input/output interfaces. Another implementation is where the first and second interface chips have different input/output interfaces.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

DETAILED DESCRIPTION

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

The present disclosure relates to a BMC system that includes a BMC CPU chip and multiple external interface chips that are connected via an external bus to the BMC CPU chip. The BMC CPU chip has basic interfaces and executes firmware to perform computer system operation functions. The interface chips have multiple input/output interfaces that send and receive data according to a specific communication protocol with different hardware components on a node. The interface chips communicate the data with the BMC CPU chip via the external bus. The ability to connect multiple external interface chips allows scalability of the BMC system to different platforms and configurations. The use of the external interface chips with little or no firmware eliminates the need to track and update different firmware for each node in a multi-node system.

Figure 2:
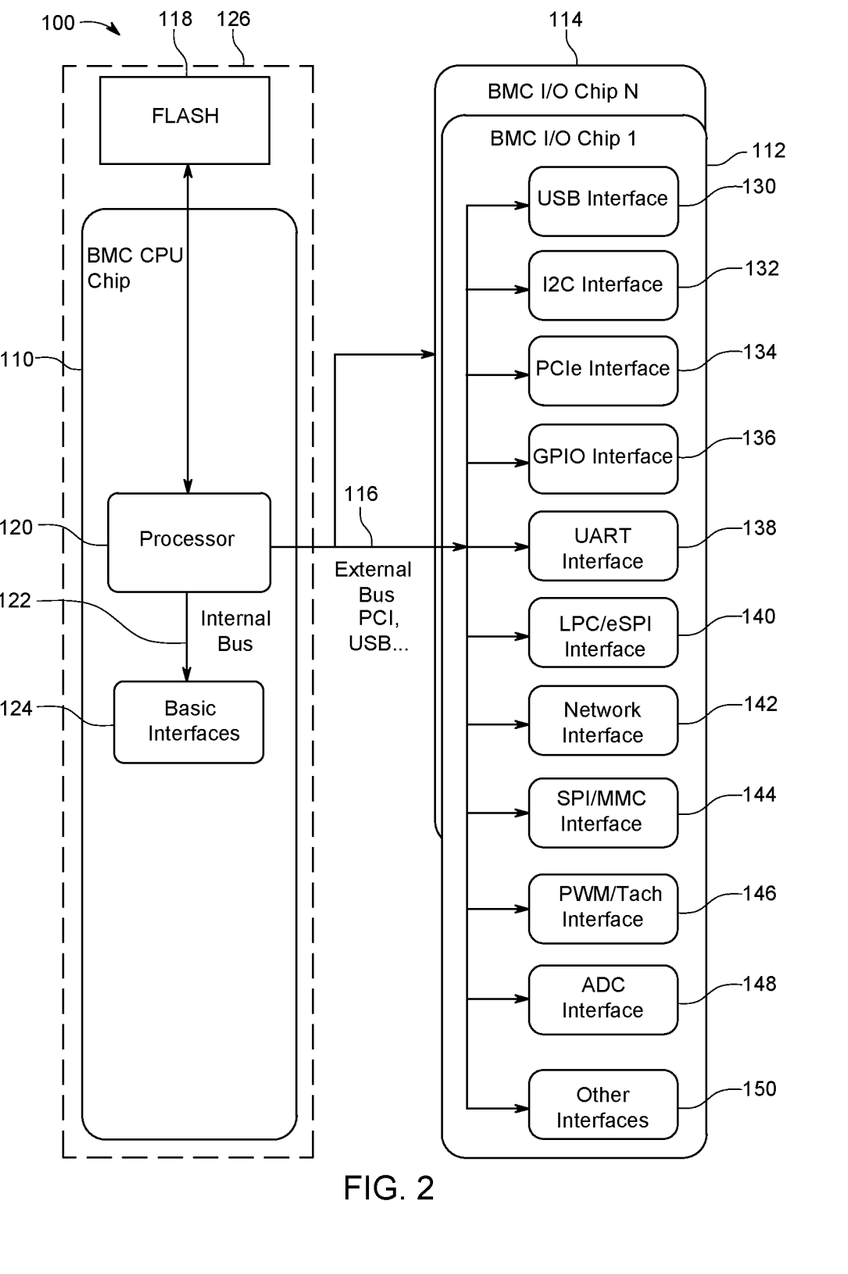
FIG. 2 is a block diagram of an example BMC system with a separate interface chip, according to certain aspects of the present disclosure.

FIG. 2 shows an example baseboard management controller (BMC) system 100. The BMC system 100 manages operations, such as power management and thermal management for a computer system. Thus, the BMC system 100 controls power supply and fan modules according to data received from power and thermal sensors in the computer system. The BMC system 100 also receives operational data from, and provides settings to various hardware components for the computer system. In this example, the BMC system 100 includes a BMC CPU chip 110 and a series of modular interface chips, such as interface chips 112 and 114, connected to an external bus 116. The interface chips 112 and 114 include input/output interfaces for various different communication protocols. Any number of interface chips and types of interface chips may be connected to the external bus 116 as required by specific design applications for a computer system. A memory device, such as a flash memory device 118, stores firmware that is executed by the BMC CPU chip 110 to perform different functions such as event logging, power management, thermal management, system start-up, remote KVM (Keyboard, Video and Mouse), Remote Media (e.g., CD-ROM, USB, DVD-ROM storage), asset management, and power sequence.

In this example, the BMC CPU chip 110 includes a relatively powerful programmable control device such as a CPU 120, an internal bus 122, and a set of interfaces 124. The BMC CPU chip 110 is mounted on a baseboard 126 that is connected to the nodes associated with the interface chips 112 and 114 via the external bus 116. The BMC CPU chip 110 includes an external bus interface that allows connection to the external bus 116. The interfaces 124 include a basic set of interfaces that allow the BMC CPU chip 110 to monitor basic hardware functions. For example, the basic set of interfaces 124 may include a GPIO interface, a UART interface, an I2C interface, a memory bus interface, and a pulse width modulation (PWM) interface. In this example, the interfaces may have limited bandwidth since they are primarily used to monitor basic functions on a baseboard. Thus, the GPIO interface may be used for LED control and button input; the SPI interface may be used for controlling flash devices; the memory bus may be used for reading and writing to DDR4 type devices; the PWM interface may be used for monitoring fan speeds; and the I2C bus may be used for reading EEPROM devices.

When the BMC system 100 is deployed to monitor operation of other computer nodes, the interface chips may have higher bandwidth input/output interfaces to provide operational data to the BMC CPU chip 110 through the external bus 116. As such, the external bus 116 has a high bandwidth and high speed communication capability. The external bus 116 thus may be a PCIe x4, a USB 3, or a similarly high bandwidth/high speed bus. The CPU 120 is preferably sufficiently powerful to process large amounts of data and send commands to different components on multiple nodes.

The BMC CPU chip 110 is coupled via the external bus 116 to any number of interface chips, such as the interface chip 112. Thus, the example BMC system 100 moves most of the interface functions to external interface chips with input/output interfaces for specific communication protocols. The interface chips do not require specialized firmware to operate with a node design, and therefore only the firmware for the BMC CPU chip 110 must be modified for upgrades in functionality. Thus, the requirement of firmware for the traditional mini-BMCs 64 on each node in FIG. 1D is eliminated. Further, the scalability of the BMC system 100 is superior to the traditional SOC BMC chip 10 in FIG. 1A since additional interface chips may be used as more nodes are added. Alternatively, different types of interface chips may be used to accommodate the communication requirements of specific nodes.

In this example, the external interface chip 112 includes a universal serial bus (USB) interface 130, an inter-integrated circuit (I2C) interface 132, a peripheral connect interface express (PCIe) interface 134, a general purpose input/output (GPIO) interface 136, a Universal Asynchronous Receiver/Transmitter (UART) interface 138, a Local Inter-Process Communication (LPC)/enhanced Serial Peripheral Interface (eSPI) interface 140, a network interface 142, an SPI/Microsoft Management Console (MMC) interface 144, a pulse width modulation (PWM)/tachometer interface 146, and an analog-to-digital converter (ADC) interface 148. Other input/output interfaces 150 for other communication protocols may also be provided.

The input/output interfaces for each of the interface chips may support different hardware components on nodes. For example, the USB interface 130 may serve as the link to a PCH or the BMC of a SOC processor, which is in an on the go (OTG) mode. The OTG mode can be a USB slave mode, where it simulates any USB device such as a storage device, a keyboard or a mouse. Alternatively, the OTG mode can also be a USB Master mode. This allows a UAB Host port of the BMC to receive inserted USB devices. In this mode, a USB storage device may be inserted in the USB port of the BMC to copy an event log or firmware update. The USB interface 130 may also serve as a remote media simulator and remote keyboard video mouse (KVM) interface. The I2C/SMBus interface 132 may be a link to a host SOC and most sensors such as temperature sensors, power sensors and the like. The PCIe interface 134 may serve as a link to a host CPU or PCH, for VGA graphic support, Management Component Transport Protocol (MCTP) features support, and remote KVM communication. The GPIO interface 136 may be used to control visual indicators such as LEDs that indicate BMC heartbeat, BMC health, BIOS POST code, power status, devices that are present (e.g., HDDs, SSDs, NVMEs, and the like) or any other statues that BMC can monitor. The UART interface 138 may be used for host serial communication over LAN or debugging. The LPC/eSPI interface 140 may serve as a link to a PCH or a host SOC, such as for receiving BIOS post codes. The network interface 142 may be a network controller side band (NC-SI) interface for communication with external devices. The SPI/MMC interface 144 may be used for BIOS firmware updates or debug logging storage. The pulse width modulation (PWM)/tachometer interface 146 may communicate with fan devices. The ADC interface 148 may communicate with different sensors.

Different interface chips may be designed to support different interfaces but still communicate with the same BMC CPU chip 110 through the external bus 116. Alternatively, certain input/output interfaces may be provided with more channels or higher bandwidth depending on the application. Alternatively, multiple interface chips may also be used to increase the bandwidth of a particular interface.

For example, some nodes may have few sensors but other nodes may have relatively larger numbers of sensors. Thus, a designer may choose to use multiple interface chips for the node with a large number of sensors. Alternatively, a specialized interface chip with a higher capacity interface such as an I2C interface with 20 channels or a GPIO interface that supports 100 pins or 200 pins, may be provided for such a node.

Thus, different nodes may have different general processors and PCHs that may be supported by the BMC system through the interfaces of the interface chips. The interface chips also allow support for a combined SOC CPU. The interface chips may also support nodes with specialized functions performed by specialized processors such as a GPU or a field programmable gate array (FPGA) programmed for special functions such as database searches. Specialized hardware components on nodes, such as serial advanced technology attachment (SATA) devices, Open Compute Project (OCP) devices, PCIe devices, and USB devices may be supported through the interface chips. Such devices may include storage devices, network interface cards (NIC), redundant array of inexpensive disks (RAID) cards, field programmable gate array (FPGA) cards, and processor cards such as graphic processing unit (GPU) cards.

In this example, the interface chips 112 and 114 do not require a programmable controller, thus eliminating the need for firmware. Since the interface chips interface with the different node designs, no firmware updates are required when new nodes are added for monitoring by the BMC CPU chip 110. Thus, only one set of BMC firmware for the BMC CPU chip 110 needs to be developed and maintained. This reduces the development cycle as generic interface chips may be used for new node configurations and designs. Alternatively, only the interface chips need to be designed for specific applications, as opposed to designing an overall traditional BMC chip. Since only one set of firmware is required, the maintenance workload in relation to multinode systems is also reduced.

Figure 3:
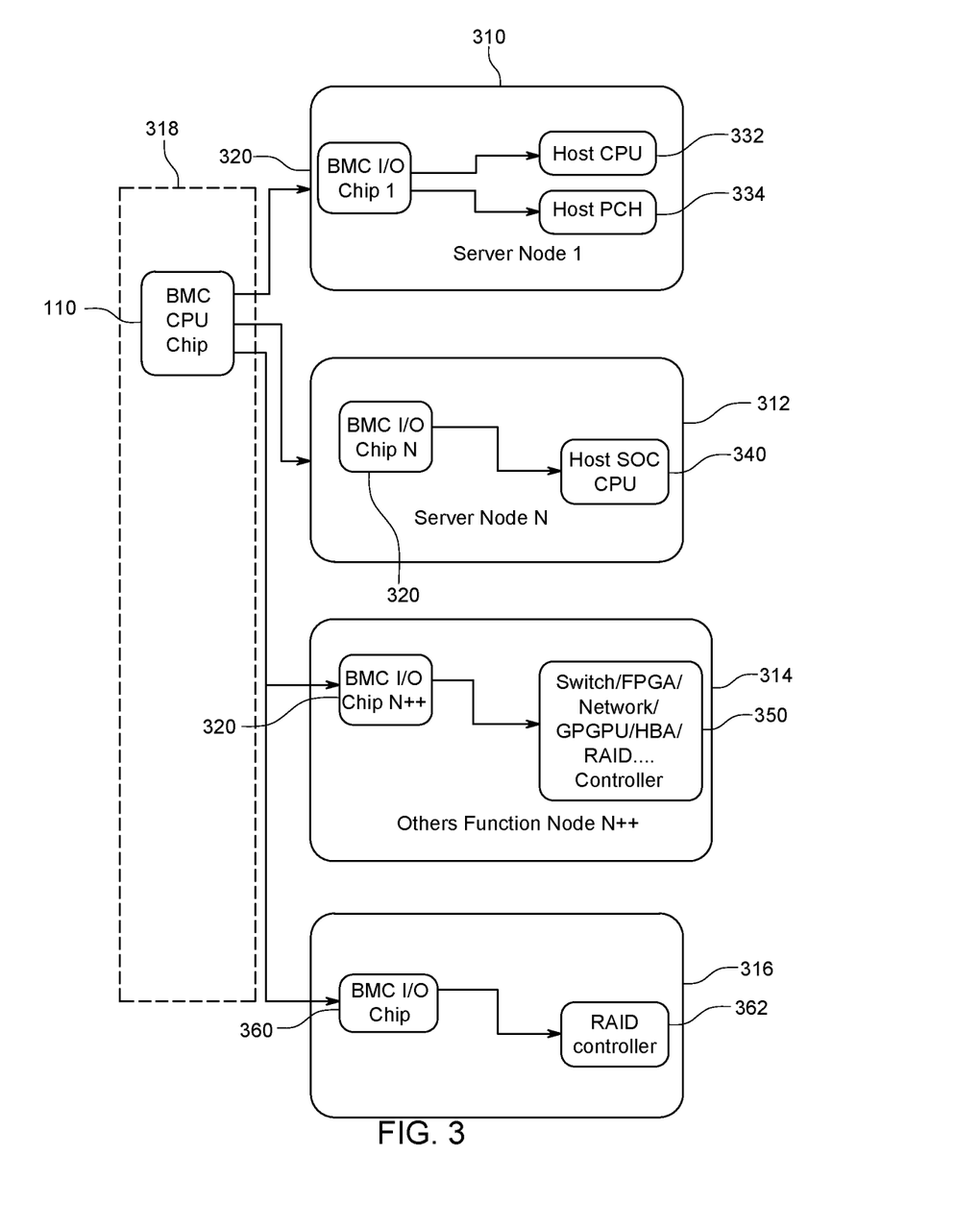
FIG. 3 is a block diagram of the example BMC system in FIG. 2 in a multi-node system, according to certain aspects of the present disclosure.

FIG. 3 shows a block diagram of a computer system 300 with different server nodes 310, 312, 314, and 316. In this example, the BMC CPU chip 110 is mounted on a baseboard 318. Each of the server nodes 310, 312, 314, and 316 may be blade servers in a chassis that are connected to the baseboard 318. The baseboard 318 may contain a common power supply and fan modules for all connected blade servers. Although four nodes are shown, it is to be understood that any number of nodes may be supported by the BMC CPU chip 110. Further, the nodes may have either identical or different designs in relation to hardware components and functions.

In this example, the nodes 310, 312, and 314 each include an identical interface chip 320. The interface chip 320 is similar to the interface chip 112 in FIG. 2 and thus includes multiple input/output interfaces for different communication protocols. Depending on the specific node design, some or all of the interfaces may be used by each interface chip 320. For example, the node 310 may include a CPU 332 and a platform control hub (PCH) 334 to facilitate communication between other components and the CPU 332. In this example, the interface chip 320 uses different interfaces to communicate with the CPU 332 and the PCH 334. The CPU 332 communicates with the interface chip 320 via the I2C interface, the PCIe interface, and the LPC/SPI interface. The PCH 334 communicates with the interface chip 320 via the USB interface, the PCIe interface, and the LPC/SPI interface.

The node 312 has a system on chip CPU 340 that integrates the functions of a PCH. The interface chip 320 may use different interfaces to communicate with the SOC CPU 340, such as the USB interface, the I2C interface, the PCIe interface, and the LPC/SPI interface. Although the node 312 has a different design than the node 310, no additional firmware is required for the BMC CPU chip 110.

The node 314 may include a specialized controller 350. The specialized controller 350 may be a switch controller, an FPGA, a network interface controller, a general purpose GPU, a host bus adapter (HBA) controller, or a redundant array of inexpensive disks (RAID) controller. The specialized controller 350 may be used with different input/output interfaces of the interface chip 320. Although the node 314 has a different design than the nodes 310 and 312, no additional firmware is required for the BMC CPU chip 110.

The node 316 in this example has a specialized interface chip 360 having a different design than that of the other interface chips 320. The node 316 has specialized controller 362 that requires a higher bandwidth interface PCIe interface. Thus, the specialized interface chip 360 has a higher bandwidth PCIe interface to handle the higher bandwidth required by the controller 362. No firmware is required for operating the specialized interface chip 360. Alternatively, if cost effective, two or more interface chips 320 may be used to provide the PCIe interface with the specialized controller 362.

The BMC system 100 in FIG. 2 may also be used for a single board computer system such as an independent server. The motherboard of such a system would simply be adapted to provide a socket for the BMC CPU chip 110 and one or more interface chips such as the interface chip 112.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A baseboard management controller (BMC) system adaptable to support multiple computer platforms, the BMC system comprising:
a BMC CPU chip including a processor executing firmware; and
an interface chip, the interface chip coupled to the BMC CPU chip via an external bus, the interface chip including a plurality of input/output interfaces, wherein a first one of the plurality of input/output interfaces communicates data in a first communication protocol when coupled to a first component on a computer node, and wherein a second one of the plurality of input/output interfaces communicates data in a second communication protocol simultaneously with the first one of the plurality of input/output interfaces communicating data in the first communication protocol, when coupled to a second component on the computer node, wherein the first communication protocol is different from the second communication protocol, and wherein the first component of the computer node is different from the second component of the computer node, wherein data communicated in the first and second protocol are sent to the BMC CPU chip exclusively via the external bus through a third communication protocol.

2. The system of claim 1, wherein the communication protocols include at least one of a group consisting of a universal serial bus (USB), an inter-integrated circuit (I2C), a peripheral connect interface express (PCIe), a general purpose input/output (GPIO), a Universal Asynchronous Receiver/Transmitter (UART), a Local Inter-Process Communication (LPC)/enhanced Serial Peripheral Interface (eSPI), a network, a pulse width modulation signal, an analog-to-digital converter signal, and an SPI/Microsoft Management Console (MMC).

3. The system of claim 1, wherein the plurality of input/output interfaces of the interface chip function independent of the firmware.

4. The system of claim 1, further comprising a memory accessible by the BMC CPU chip, wherein the memory stores the firmware.

5. The system of claim 1, wherein the BMC CPU chip includes a plurality of input/output interfaces coupled to the processor via an internal bus.

6. The system of claim 1, further comprising a second interface chip coupled to the BMC CPU chip via the external bus, the second interface chip including a plurality of input/output interfaces for the different communication protocols to interface with the components on a computer node.

7. The system of claim 6, wherein the BMC CPU chip is on a baseboard, and wherein the first and second interface chips are on separate computer nodes.

8. The system of claim 7, wherein the first and second interface chips have identical input/output interfaces.

9. The system of claim 7, wherein the first and second interface chips have different input/output interfaces.

10. The system of claim 5, wherein the BMC CPU chip is on a baseboard, and wherein the first and second interface chips are both on a computer node.

11. A multi-node computer system comprising:
a baseboard having a baseboard management controller (BMC) CPU chip and a memory storing firmware for the BMC CPU chip, the BMC CPU chip including a processor and an external bus interface;
an external bus coupled to the external bus interface of the BMC CPU chip;
a first computer node having a first BMC interface chip coupled to the external bus, wherein the first BMC interface chip includes a plurality of input/output interfaces simultaneously coupled to components on the first computer node, wherein a first one of the plurality of input/output interfaces communicates data in a first communication protocol when coupled to a first component on the first computer node, and wherein a second one of the plurality of input/output interfaces communicates data in a second communication protocol simultaneously with the first one of the plurality of input/output interfaces communicating data in the first communication protocol, when coupled to a second component on the first computer node, wherein the first communication protocol is different from the second communication protocol, and wherein the first component of the computer node is different from the second component of the computer node, wherein data communicated in the first and second protocol are sent to the BMC CPU chip exclusively via the external bus through a third communication protocol; and a second computer node having a second BMC interface chip coupled to the external bus and components on the second computer node.

12. The computer system of claim 11, wherein each of the first and second BMC interface chips includes a plurality of input/output interfaces for different communication protocols to interface with the respective components, the communication protocols including at least one of a group consisting of a universal serial bus (USB), an inter-integrated circuit (I2C), a peripheral connect interface express (PCIe), a general purpose input/output (GPIO), a Universal Asynchronous Receiver/Transmitter (UART), a Local Inter-Process Communication (LPC)/enhanced Serial Peripheral Interface (eSPI), a network, a pulse width modulation signal, an analog-to-digital converter signal, and an SPI/Microsoft Management Console (MMC).

13. The computer system of claim 11, wherein the plurality of input/output interfaces function independent of firmware.

14. The computer system of claim 11, wherein the baseboard includes a memory storing firmware accessible by the BMC CPU chip.

15. The computer system of claim 11, wherein the BMC CPU chip includes a plurality of interfaces coupled to the processor via an internal bus.

16. The computer system of claim 11, wherein the first and second interface chips have identical input/output interfaces.

17. The computer system of claim 11, wherein the first and second interface chips have different input/output interfaces.

* * * * *